(12) United States Patent
Bliss (10) Patent No.: US 9,194,737 B2
(45) Date of Patent: Nov. 24, 2015

(54) METHOD OF DETERMINING VEHICLE SCALE HEALTH AND SUITABILITY FOR USE VIA WEIGHT TRANSFER PATTERN ANALYSIS

(71) Applicant: Mettler-Toledo, LLC, Columbus, OH (US)

(72) Inventor: Douglas P. Bliss, Worthington, OH (US)

(73) Assignee: Mettler-Toledo, LLC, Columbus, OH (US)

( * ) Notice: Subject to any disclaimer, the term of this patent is extended or adjusted under 35 U.S.C. 154(b) by 209 days.

(21) Appl. No.: 14/137,986

(22) Filed: Dec. 20, 2013

(65) Prior Publication Data

US 2015/0177054 A1  Jun. 25, 2015

(51) Int. Cl.
*G01G 23/01* (2006.01)
*G01G 19/02* (2006.01)
*G01G 19/03* (2006.01)

(52) U.S. Cl.
CPC .............. *G01G 23/01* (2013.01); *G01G 19/021* (2013.01); *G01G 19/022* (2013.01); *G01G 23/017* (2013.01)

(58) Field of Classification Search
CPC ... G01G 19/021; G01G 19/022; G01G 23/01; G01G 23/017
See application file for complete search history.

(56) References Cited

U.S. PATENT DOCUMENTS

| | | | | |
|---|---|---|---|---|
| 3,593,263 | A * | 7/1971 | Olsen | 340/935 |
| 3,825,734 | A | 7/1974 | Jacobs et al. | |
| 3,835,945 | A * | 9/1974 | Yamanaka et al. | 177/134 |
| 4,049,069 | A * | 9/1977 | Tamamura et al. | 177/134 |
| 4,709,770 | A * | 12/1987 | Kohashi et al. | 177/50 |
| 4,729,443 | A | 3/1988 | Iadarola | |
| 4,804,052 | A * | 2/1989 | Griffen | 177/25.14 |
| 6,576,849 | B2 | 6/2003 | Bliss et al. | |
| 2009/0151421 | A1* | 6/2009 | Susor | 73/1.13 |
| 2011/0203857 | A1 | 8/2011 | Trautweiler | |
| 2014/0163909 | A1* | 6/2014 | Srinivasan et al. | 702/63 |

* cited by examiner

*Primary Examiner* — Randy W Gibson
(74) *Attorney, Agent, or Firm* — Standley Law Group LLP (57) ABSTRACT

Methods of determining vehicle scale health and suitability for use via weight transfer pattern analysis. Dynamically changing patterns of measurement values are seen at each load cell of a vehicle weighing scale as a vehicle enters, remains on, and leaves the scale platform thereof during a normal vehicle weighing operation. These patterns may be analyzed to provide an indication of whether a given load cell is operating properly and/or being manipulated to produce a false weight reading.

20 Claims, 5 Drawing Sheets

Note: Gross weight < threshold resets from any state to Empty Scale

Table 1

| Vehicle is | Gross Weight | Entry Pair | Exit Pair | Any Pair | All Pairs |
|---|---|---|---|---|---|
| Off Scale | < Threshold | | | | |
| Entering Scale | Not Decreasing | Unstable | | | |
| Moving on Scale | Stable | | | Unstable | |
| Stopped on Scale | Stable | | | | Stable |
| Loading | Increasing | | | | Not Decreasing |
| Unloading | Decreasing | | | | Not Increasing |
| Exiting Scale | Not Increasing | | Unstable | | |

FIG. 4

Table 2

| State | On State Entry | While In State | On State Exit |
|---|---|---|---|
| Empty Scale | Clear all timestamps | | Store time stamp<br>Store entry pair |
| Moving On Scale | Clear last analysis results | Analyze test cases 4-5 | Log results |
| Exiting Scale | | | Analyze test cases 1-3<br>Log results |

Test Case 1 -- All load cells should see at least one load-unload cycle per vehicle.
Test Case 2 -- Load should be initially applied in sequential, direction-of-travel order.
Test Case 3 -- Left-right load should be encountered substantially simultaneously.
Test Case 4 -- The load COG moves monotonically in the direction of travel; the COG can reverse during entry or exit, but only as a vehicle axle moves across the end of the scale.
Test Case 5 -- Left-right load balance remains constant.

*FIG. 5*

METHOD OF DETERMINING VEHICLE SCALE HEALTH AND SUITABILITY FOR USE VIA WEIGHT TRANSFER PATTERN ANALYSIS

TECHNICAL FIELD

Methods for determining, during normal use, whether the load cells of a vehicle scale are functioning properly and/or for detecting deliberate and inappropriate manipulation of the load cells.

BACKGROUND

A typical vehicle weighing scale includes at least one scale platform (or deck) for receiving a vehicle to be weighed. Such a scale platform is often comprised of a metal framework with a steel plate deck, or the scale platform may be comprised of concrete (typically enclosed within a steel frame). The scale platform is normally supported from beneath by a number of weighing elements, such as load cells. Vehicle weighing scales are also typically constructed with two rows of load cells aligned in the direction of vehicle travel across the scale platform. When a vehicle is placed on the scale platform, each load cell produces an output signal that reflects the portion of the vehicle weight borne by that load cell. The signals from the load cells are added to produce an indication of the total weight of the vehicle residing on the scale platform of the weighing scale.

Vehicle weighing scales, and their associated scale platforms, can be of various size. For example, such vehicle weighing scales are commonly of a size that is sufficient to accommodate a multi-axle vehicle, such as a semi-truck trailer. Vehicle scales of such size may be assembled using multiple scale platform segments (modules) that are connected end-to-end to provide a full-length scale platform.

In the past, it has been known that a run time analysis of individual load cells of such a vehicle weighing scale can be used to determine the health of the load cell communication network and to record abuse. However, there has heretofore been no method for determining, from normal use of a vehicle weighing scale, whether the load cells of the scale are functioning properly and/or whether the load cells are being deliberately and inappropriately manipulated, such as for the purpose of cheating in a sales transaction. Method embodiments presented herein allow for a determination of one or both conditions.

SUMMARY

Broadly speaking, method embodiments of the invention analyze the dynamically changing patterns of measurement values seen at each load cell of a vehicle weighing scale (hereinafter also just "scale") as a vehicle enters, remains on, and leaves the scale platform thereof during a normal vehicle weighing operation. These dynamically changing patterns of measurement values may be observed and documented with respect to the load cells of a given vehicle scale when it is known that all of the load cells are working properly and have not been tampered with, to establish a normal pattern of load cell behavior as a vehicle enters, stops, is optionally loaded or unloaded, and exits the scale. Subsequently, the dynamically changing patterns of measurement values seen at the load cells of a vehicle weighing scale of interest may be compared against an established and expected normal pattern of load cell behavior for a comparable vehicle scale to indicate whether a given load cell measurement is believable and internally consistent (e.g., whether a load cell of the scale of interest is operating improperly and/or being manipulated to produce a false weight reading).

More particularly, established normal patterns of load cell behavior may be used as operational tests. Method embodiments of the invention realize that a faulty load cell, or a load cell that is being manipulated to produce false weight readings, will generally fail one or more of these tests. The tests operate on the premise of the truth of a number of assumptions, the expected (normal pattern of) behavior of the load cells of the weighing scale during a normal vehicle weighing operation, and the corresponding expected movement of the vehicle. The assumptions and expected behavior of the weighing scale are associated with the scale construction and the operation of the load cells during a normal vehicle weighing operation.

In this regard, it is first assumed that the scale is normally not loaded. That is, a vehicle normally resides on the scale platform only during a weighing operation or associated entry to or exit from the scale platform—otherwise the scale platform is normally devoid of objects resting thereon. It is also initially assumed that during a vehicle weighing operation, only a vehicle and its cargo will be weighed. It is further assumed that vehicles to be weighed enter the scale at one end and exit at the opposite end, with either end capable of serving as the entry point; that vehicles do not intentionally reverse direction while on the scale platform; and that errors will be triggered for unforeseen but perfectly legitimate reasons.

With consideration given to the aforementioned assumptions, the scale and the associated load cells will exhibit expected normal patterns of behavior that may serve as subsequent tests of proper operation for comparable scales. In this regard, all of the load cells should experience at least one load-unload cycle for each vehicle weighing operation performed. Subject to certain caveats, any load cell that does not move during a weighing transaction is likely in error. Additionally, and also subject to certain caveats, because a vehicle will always enter the scale from one of the two ends, one end-pair of load cells will always be the first load cell pair to experience a load, followed by the next pair along the path of travel of the vehicle, and so forth. Consequently, during a normal vehicle weighing operation, load should be initially applied to the load cells in a sequential, direction-of-travel order. Likewise, the two load cells of a given load cell pair should simultaneously experience a left-right load.

In addition to the above-described normal patterns of behavior, it is also expected, subject to certain caveats, that the load center of gravity associated with the vehicle being weighed moves monotonically in the direction of travel of the vehicle while the vehicle is on the scale platform. In other words, the load center of gravity is generally expected to move across the scale platform starting from one end, most likely stop, and then exit at the other end without backing up. Lastly, subject to certain caveats, the left-right load balance should remain constant while the vehicle remains fully on the scale platform.

Generally speaking, a mathematical model (state machine) that defines a normal pattern of load cell behavior may be created based on the various expected states of each load cell during a vehicle weighing operation. This allows for, among other things, the detection of the leading edge of each loading cycle to which a load cell is subjected. A time stamp may be stored for each load cycle leading edge. The load cell state machine is framed by the scale gross weight being greater that its threshold weight. A controller, such as the weighing scale controller, may be used to perform the aforementioned pattern of behavior analysis and to thereby determine whether the load cells of the scale are operating properly and/or to detect a deliberate manipulation of the load cells.

As described above, the load cells of a vehicle weighing scale are expected to undergo various state transitions during a vehicle weighing operation, with the list of state transitions defining the state machine. For example, the output (condition) of a given load cell may transition between stable, unstable, not increasing and not decreasing states during a weighing operation. Similarly, the gross weight reported by the load cells of the scale may also transition between various states during a vehicle weighing operation. These states may include stable, not decreasing, not increasing, decreasing, and increasing states.

The state transitions begin with a vehicle entering the scale and moving on the scale platform. The vehicle either moves to a stopped position for weighing or exits the scale platform if the weighing operation is aborted. While the vehicle remains stopped on the scale platform, cargo or other permissible items may be added to or removed from the vehicle. From the stopped position, the vehicle will normally begin moving on the scale platform once again, until the vehicle exits the scale and the scale returns to an empty condition. All of these vehicle and vehicle-related activities will affect the load experienced by the load cells and the weight readings produced thereby. In other words, movement of the vehicle, stopping of the vehicle, and loading or unloading of the vehicle will all result in the load cell state transitions that form the state machine.

From these state transitions and the weight readings of the load cells and/or the gross weight value resulting from the load cell weight readings, an inferred vehicle position/state table may also be created. The vehicle position and state may be inferred from the logical AND value of the state machine inputs listed in the columns of the table.

The state table is reflective of the expected (normal) patterns of behavior of the load cells and the gross weight load experienced by the scale during a normal vehicle weighing operation. Consequently, the state conditions of the state table relating to the gross weight and load cell conditions may be used in one regard to infer vehicle position during a vehicle weighing operation. Alternatively, the actual pattern of behavior of load cell conditions and the gross weight value readings observed during a given vehicle weighing operation can be compared against the normal pattern of behavior of the load cell conditions and the gross weight value readings as reflected in the state table, to determine whether a given load cell measurement is believable and internally consistent (e.g., whether a load cell is operating properly and/or being manipulated to produce a false weight reading). The output of a faulty load cell, or a load cell that is being manipulated to produce false weight readings, will not match one or more of the expected state conditions listed in the state table.

BRIEF DESCRIPTION OF THE DRAWINGS

In addition to the features mentioned above, other aspects of the invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENTS

Method embodiments of the invention may be used to analyze the dynamically changing patterns of measurement values seen at each load cell of a vehicle weighing scale as a vehicle traverses the scale platform of the scale during a normal vehicle weighing operation. This analysis may be used to determine whether a load cell is operating properly and/or being manipulated to produce a false weight reading.

Figure 1:
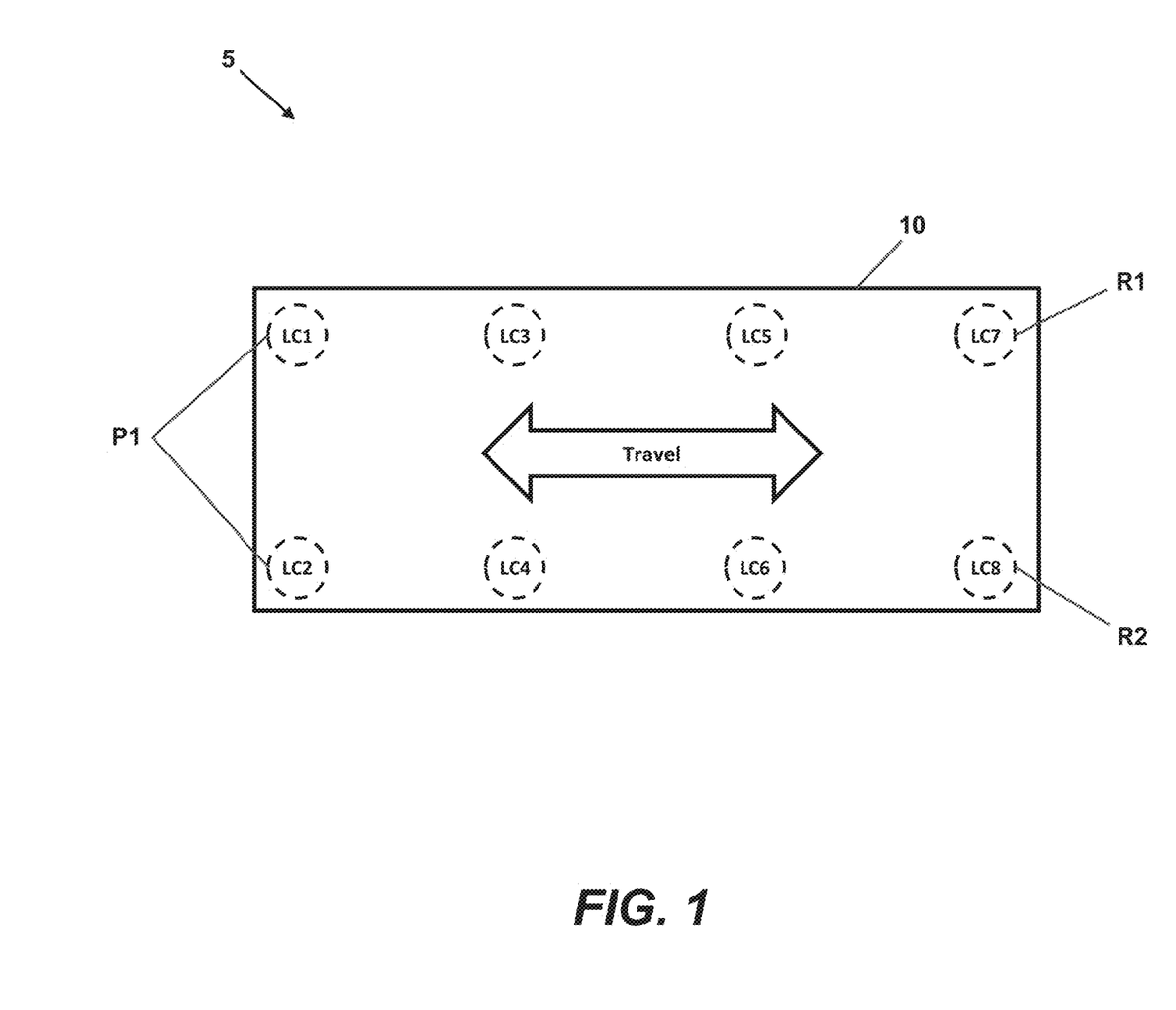
FIG. 1 schematically illustrates an exemplary vehicle weighing scale having a plurality of load cells.

An exemplary vehicle weighing scale 5 is depicted in FIG. 1 for purposes of further describing exemplary embodiments of the invention. The scale 5 is shown to include a scale platform 10 that is supported from beneath by a plurality of load cells LC1-LC8. The load cells LC1-LC8 are arranged in two spaced apart rows R1, R2 aligned in the direction of normal vehicle travel across the scale platform 10. Corresponding load cells from each row R1, R2 (i.e., LC1-LC2, LC3-LC4, LC5-LC6, and LC7-LC8) are considered to form load cell pairs based on load application during a vehicle weighing operation.

As indicated in FIG. 1, vehicles to be weighed may travel across the scale platform 10 in either direction—meaning that either end of the scale 5 is capable of serving as the entry point. However, in normal practice, vehicles will always enter the scale 5 at one end and exit at the opposite end. For purposes of illustration, and not limitation, the left side (end) of the scale 5 is designated herein as the normal entry end, as indicated by the designators LC1 and LC2 for the initial pair P1 of load cells to be loaded as a result of a vehicle entering from the left end of the scale.

When a vehicle enters, stops, is optionally loaded or unloaded, and exits the scale 5, the load cells LC1-LC8 will exhibit a pattern of measurement behavior that results in various state transitions. These patterns of measurement behavior will change dynamically as the vehicle moves across the scale. The dynamically changing patterns of behavior may be observed with respect to the scale 5 when it is known that the load cells LC1-LC8 have not been tampered with and are working properly, in order to establish a normal pattern of behavior. Subsequently, the dynamically changing patterns of measurement values seen at the load cells of the scale 5 or of a substantially similar vehicle weighing scale of interest, may be compared against the established normal pattern of load cell behavior to determine whether a given load cell measurement is indicative of improper load cell operation and/or a load cell that is being manipulated to produce a false weight reading.

More specifically, established normal patterns of load cell behavior and associated load cell state transitions for a given scale may be used as tests of proper load cell operation for the same scale at some subsequent point in time. The same tests may also be used to assess the load cell operation of other comparable scales.

As described above, the tests operate on the premise of the truth of a number of assumptions, the expected normal behavior of the load cells during a typical vehicle weighing operation, and the corresponding expected movement of the vehicle across the scale. The assumptions and expected behavior of a given weighing scale are associated with the scale construction and the operation of the load cells during a normal vehicle weighing operation.

A first assumption is that the scale is normally not loaded. That is, the scale platform is normally empty unless a vehicle is placed on the scale platform for the purpose of a weighing operation. Another assumption according to method embodiments hereof is that only a vehicle and its cargo will be weighed during a given vehicle weighing operation. In this regard, there is considered to be no normal use case in which a load is deposited on or removed from the scale platform without a vehicle first entering the scale. Additionally, while cargo may be added or removed from the vehicle being weighed, such activity may occur only when the vehicle is stopped on the scale platform. It is further assumed that vehicles to be weighed enter the scale at one end and exit at the opposite end and that vehicles do not intentionally reverse direction (i.e., back up) while on the scale platform.

Figure 2:
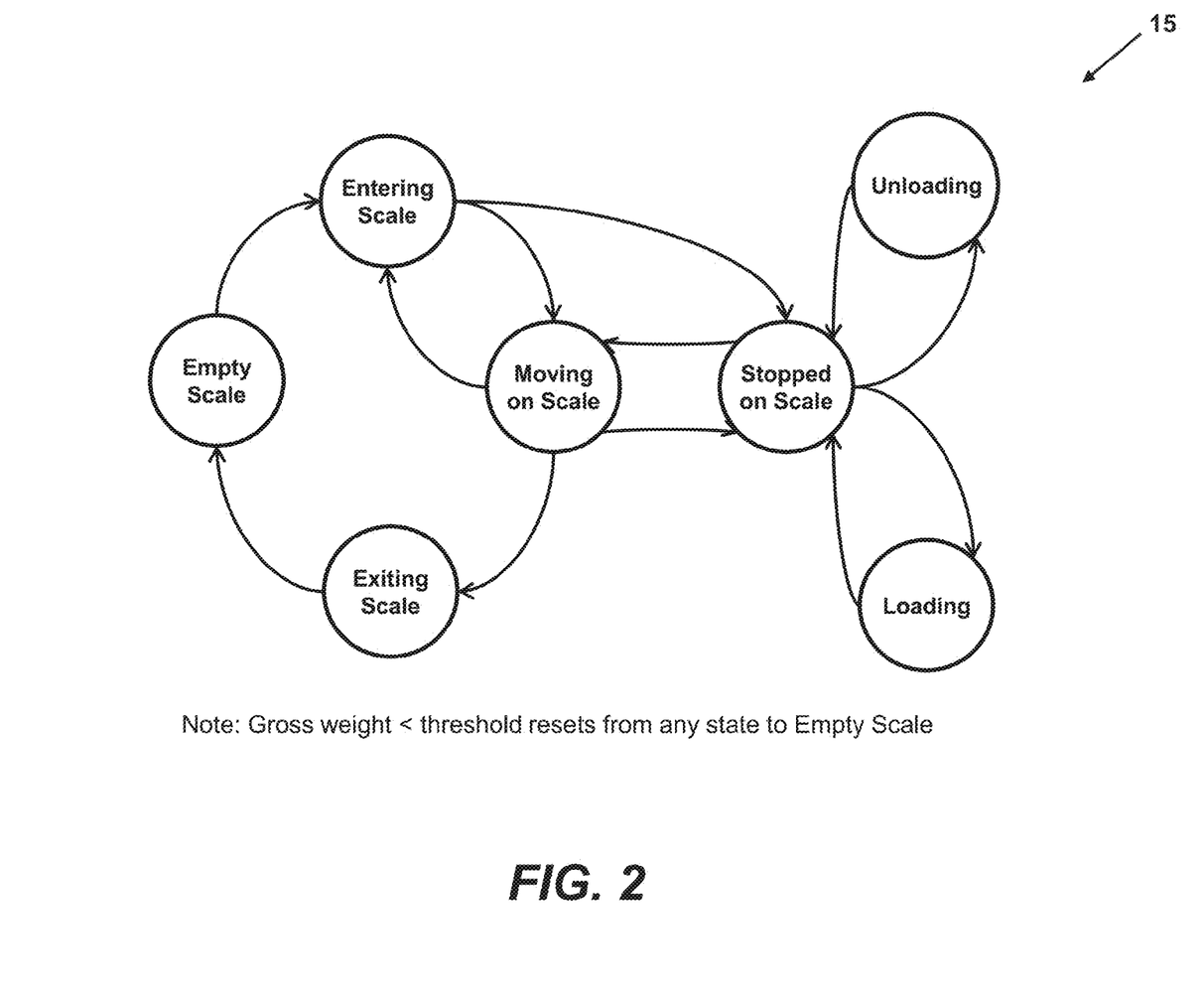
FIG. 2 is a flow chart that represents the expected movement of a vehicle on a vehicle weighing scale during a vehicle weighing operation.

FIG. 2 graphically describes an expected pattern of vehicle travel during a typical vehicle weighing operation. The load cells of a vehicle weighing scale are expected to undergo various state transitions that coincide with the changes in vehicle position/state described in FIG. 2.

The vehicle travel pattern 15 of FIG. 2 begins with a vehicle entering an initially empty vehicle scale and moving along the scale platform. The vehicle either moves to a stopped position for weighing or exits the scale platform if, for example, the weighing operation is aborted. As indicated in FIG. 2, it is also possible, prior to reaching a stopped weighing position on the scale platform, for a vehicle to temporarily stop and restart movement.

Once the vehicle stops moving on the scale platform, and as long as the vehicle remains stopped, cargo or other permissible items may be added to or removed from the vehicle. As should be obvious, the addition or removal of cargo will affect the load experienced by the load cells and the weight readings produced thereby, assuming that the load cells are operating properly and have not been tampered with.

Upon leaving the stopped weighing position (e.g., after weighing), the vehicle will normally move along the scale platform until the vehicle exits the scale. The scale will then return to an empty state, as reflected in FIG. 2.

As should be well understood by one of skill in the art, properly functioning and non-manipulated load cells of the scale should exhibit an expected (normal) pattern of behavior during vehicle movement and a corresponding weighing operation. In regard to the aforementioned normal patterns of behavior, it is first expected that all of the load cells will experience at least one load-unload cycle for each vehicle weighing operation performed. Any load cell that does not move during a weighing operation is likely in error. This conclusion is premised on certain caveats, said caveats being that (1) a minimum load threshold is required for triggering load cell activity; and (2) the analysis of load cell activity requires the presence of a vehicle, which is indicated when the gross weight>threshold weight.

Because a vehicle always enters a scale from one of two ends, another expected pattern of behavior is that the load of the vehicle should be initially applied to the load cells in a sequential, direction-of-travel order. In other words, one end-pair of load cells (i.e., P1 in FIG. 1) will always experience a load first, then the next pair, and so forth (e.g., pair LC3-LC4 in FIG. 1, followed by pair LC5-LC6, and then pair LC7-LC8). This expected behavior is also premised on certain caveats, said caveats being that (1) load cells are evaluated in pairs for purposes of time stamping according to method embodiments hereof; (2) a minimum load threshold is required for triggering load cell pair evaluation; (3) only the first loading order is evaluated—load cells may load-unload several times per vehicle; and (4) the analysis of load cell activity requires the presence of a vehicle, which is indicated when the gross weight>threshold weight.

It is also expected that the two load cells of a given load cell pair will simultaneously experience a left-right load. That is, the two load cells of a load cell pair should both see the leading edge of an axle loading or unloading almost simultaneously. Consequently, a single load cell trigger when both load cells of a pair experience a load is likely an error.

Furthermore, it is expected that the load center of gravity (COG) associated with the vehicle being weighed moves monotonically in the direction of travel of the vehicle while the vehicle is on the scale platform. That is, the load COG is generally expected to move across the scale platform starting from one end, most likely stop, and then exit at the other end without backing up. This expected behavior is premised on certain caveats, said caveats being that (1) a one-dimensional center of gravity is calculated in the direction of travel only, thus load cell pair data is used; (2) load cell spacing in the direction of travel must either be known, or a uniform spacing should be assumed; (3) there must be hysteresis in the evaluation of the forward motion to prevent false triggers; (4) the analysis of load cell activity requires the presence of a vehicle, which is indicated when the gross weight>threshold weight; and (5) a COG analysis should not be performed during loading or unloading activity on the scale.

Lastly, it is also expected that the left-right load balance should remain constant while the vehicle to be weighed remains fully on the scale platform. In other words, while it is unlikely that a vehicle will present a symmetrically balanced transverse (left-right) loading pattern while on the scale platform, the balance of left-right load should at least remain constant within some tolerance range while the vehicle is stopped and fully residing on the scale platform. Such a balanced left-right load is indicated when the ratio of the sum of all of the left side load cell weight readings to the sum of all of the right side load cell weight readings remains nearly constant. As with several of the above-described conclusions, this conclusion is premised on certain caveats, said caveats being that (1) the load imparted by the vehicle may not be two-dimensionally symmetric and thus, the left-right balance during scale entry and exit should be ignored; (2) a vehicle carrying a flowable load (e.g., a tanker truck carrying a liquid) may present left-right oscillation due to shifting of the load (e.g., sloshing liquid); and (3) the analysis of load cell activity requires the presence of a vehicle, which is indicated when the gross weight>threshold weight.

Referring again to the exemplary scale 5 of FIG. 1, the various state transitions experienced by the load cells LC1-LC8 as a vehicle crosses the scale as represented in FIG. 2 may be used to create a mathematical model (state machine) that describes an expected (normal) pattern of load cell behavior. This allows for, among other things, the detection of the leading edge of each loading cycle to which a load cell is subjected. A time stamp may be stored for each load cycle leading edge.

Figure 3:
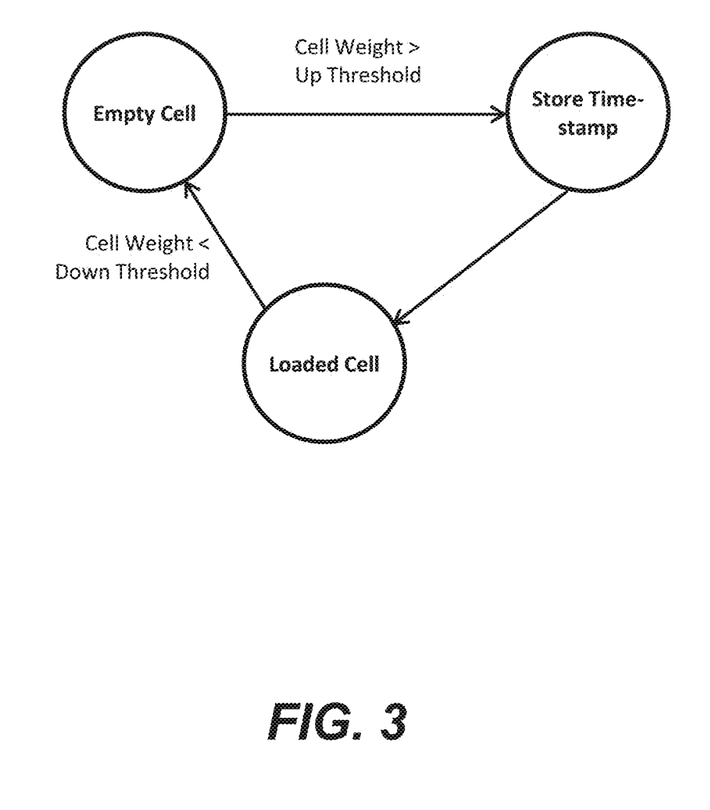
FIG. 3 is reflective of an exemplary state machine and associated thresholds that are created for each load cell of a vehicle weighing scale according to method embodiments hereof.

It should be noted that, due to the existence of multi-axle vehicles, multiple leading edges might be seen during the weighing operation of a single vehicle. As illustrated in FIG. 3, an Up Threshold value and a Down Threshold value is thus set for each load cell. The Up Threshold value is associated with an increase in load borne by a load cell as a vehicle to be weighed enters the scale. The Down Threshold value is associated with a decrease in the load borne by the load cell as a vehicle to be weighed exits the scale. The Up Threshold value is set higher than the Down Threshold value to prevent false triggers when the load on a given load cell is close to the threshold value. The load cell state machine is framed by the scale gross weight being greater that its threshold weight.

Figure 4:
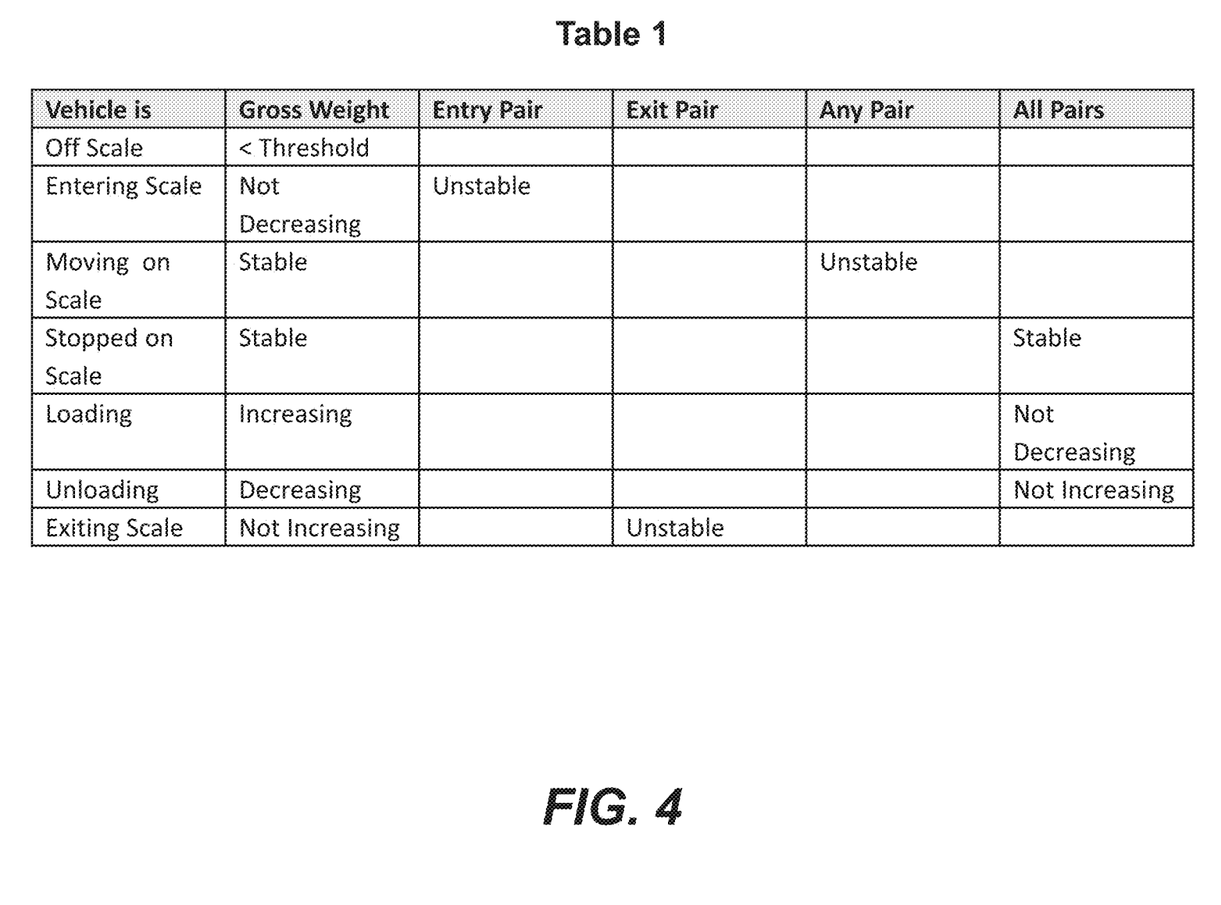
FIG. 4 is an exemplary inferred vehicle position/state table that may be created according to method embodiments hereof.

The state transitions experienced by the load cells LC1-LC8 of the scale 5 may also be used in conjunction with the gross weight value resulting from the combined load cell weight readings, to create an inferred vehicle position/state table. One such exemplary vehicle position/state table is shown in FIG. 4 as Table 1.

As can be understood from a reading of the heading row of Table 1, indications are provided for expected vehicle position/activity ("Vehicle is"), gross weight reading state, the state of the entry load cell pair, the state of the exit load cell pair, the state of any load cell pair, and the state of all the load cell pairs. It is to be understood that the headings of Table 1 are provided for descriptive purposes only, and are not intended to be in any way limiting in nature. The vehicle position, as well as the gross weight and load cell state, may be inferred from the logical AND value of the conditions listed in the columns of Table 1.

A review of the "Vehicle is" column and the "Gross Weight" column of Table 1 reveals that when there is no vehicle on the scale, the gross weight reading provided by the load cells is expected to be less than the set threshold weight value. During the time period that the vehicle is entering the scale, it is expected that the gross weight reading will not decrease. While the vehicle is moving on the scale platform or is stopped on the scale platform, it is expected that the gross weight reading will be stable. If the vehicle is loaded while stopped on the scale platform, it is expected that the gross weight reading will increase. Contrarily, if the vehicle is unloaded while stopped on the scale platform, it is expected that the gross weight reading will decrease. During the time period that the vehicle is exiting the scale, it is expected that the gross weight reading will not increase.

A review of the "Vehicle is" column and the "Entry Pair", "Exit Pair", "Any Pair" and "All Pairs" load cell state columns of Table 1 reveals an expectation that the outputs of the entry load cell pair will be unstable while the vehicle is entering the scale. Similarly, it is expected that the outputs of the exit load cell pair will be unstable while the vehicle is exiting the scale. Furthermore, when the vehicle is moving on the scale platform, it is generally expected that the outputs of one or more load cell pairs of the scale will be unstable. Conversely, it is generally expected that the outputs of all of the load cell pairs of the scale will be stable when the vehicle is stopped on the scale platform, will not decrease while the vehicle is loaded while on the scale platform, and will not increase while the vehicle is unloaded while on the scale platform.

A state table (e.g., Table 1) produced according to method embodiments hereof is graphically representative of the load cell state machine and reflective of the normal pattern of behavior exhibited by the load cells and the gross weight load experienced by the scale during a typical vehicle weighing operation. As such, the state conditions of the state table may be used in one regard to infer vehicle position during a vehicle weighing operation. For example, and referring to exemplary Table 1 for illustration, if the output of the entry load cell pair of the scale of interest is unstable, it is expected that the vehicle being weighed would be entering the scale at that point in time.

Method embodiments of the invention are based on the understanding that a faulty load cell, or a load cell that is being manipulated to produce false weight readings, will generally fail one or more of the aforementioned tests. That is, the output of a faulty or manipulated load cell will not reflect an established normal pattern of load cell behavior during weighing operations of the scale. Such deviations from the normal pattern of load cell behavior (i.e., test failures) may be used to evaluate the condition of the load cell.

In regard to test failures, a single instance of a single load cell failing a single test may be defined as an "event". Events are preferably counted and logged. A certain number of events are to be expected, due to, for example, a forklift being driven diagonally across the scale, or an unevenly loaded vehicle driving normally across the scale. Multiple instances of the same event that are in excess of the number of instances typically seen during normal scale operation may be defined as a "trend". The normal operation event threshold is not zero and must either be learned by the system or set by an installer. Trends must be evaluated over some time period (e.g., daily or weekly). A determination of improper load cell operation is not based on an event, but rather on an observed trend.

System and method embodiments may operate to provide notice (an alert) of suspicious load cell behavior. For example, an alert may be sent to an appropriate party, who may or may not be the local operator. An alert may also be sent to various appropriate parties. Alternatively, a system may be configured to never send alerts. For example, a stored event log file or printed event log may ultimately be more useful than an alert. In this case, a technician might evaluate such a log to determine system health and make recommendations regarding possible repairs or changes to daily operating procedures (e.g., keep forklifts off the scale, have someone watch a particular operator for evidence of cheating, etc.).

Referring again to Table 1 for purposes of illustration, it can be understood how the actual pattern of behavior of the gross weight value readings and the load cell pair conditions during a given vehicle weighing operation can be compared against the expected normal pattern of behavior of the gross weight value readings and the load cell pair conditions, to determine whether a given load cell measurement is believable and internally consistent (i.e., whether a load cell is operating properly and/or being manipulated to produce a false weight reading). Particularly, the output of a faulty load cell, or a load cell that is being manipulated to produce false weight readings, will not match one or more of the expected state conditions listed in the state table. For example, if the output of the entry pair of load cells remains stable while a vehicle enters the scale, it may be assumed that the entry pair of load cells are not operating properly or have been inappropriately manipulated. Similarly, if the gross weight reading of a given load cell does not increase during loading of a vehicle while the vehicle is on the scale, a faulty load cell(s) or an inappropriate manipulation of a load cell(s) may also be indicated.

Figure 5:
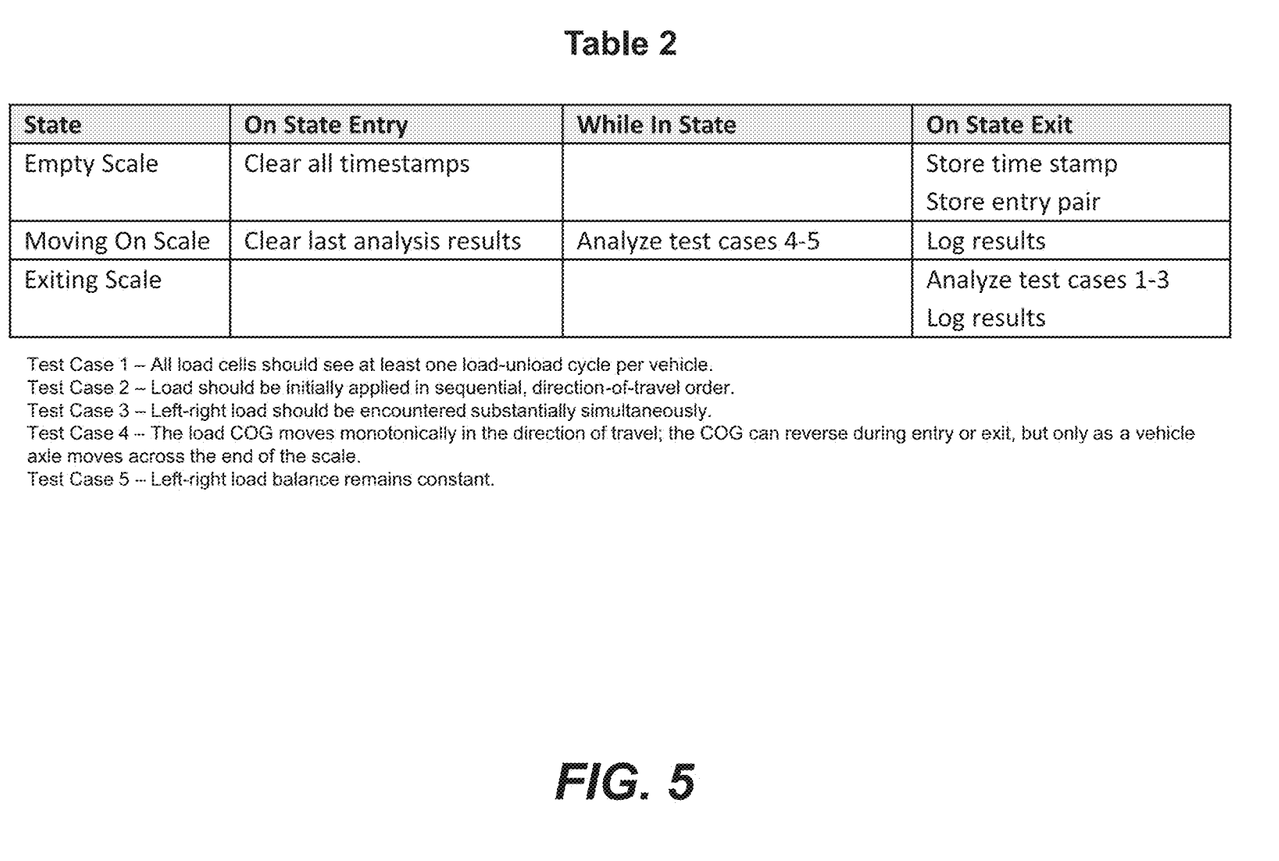
FIG. 5 is a table indicating exemplary data logging and analysis activities to be performed in conjunction with various vehicle positions during a typical vehicle weighing operation.

Time stamp data may be used to help determine vehicle location/state when evaluating the load cell pair outputs for proper function. Exemplary time stamp operations are described in Table 2 of FIG. 5, as are other exemplary functions that are preferably associated with exemplary method embodiments hereof. For example, it can be seen that when a scale becomes empty all existing time stamps should be cleared, and when the vehicle enters the scale (i.e., the scale exits the "empty scale" state) a corresponding time stamp and load cell entry pair output data should be stored. When a vehicle is moving on the scale, Table 2 indicates that the last analysis results should be cleared on vehicle entry, Test Cases 4-5 should be analyzed as the vehicle traverses the scale, and the analysis results should be logged at vehicle exit. When the vehicle exits the scale, Table 2 indicates that Test Cases 1-3 should also be analyzed and the results should be logged.

A processor and associated programming are used to analyze the gross weight reading and load cell or load cell pair output states in method embodiments hereof, and to thereby determine whether the load cells of the scale are operating properly and/or to detect a deliberate manipulation of the load cells. The programming may include several algorithms for this purpose, with the algorithms executing on the processor. The processor may be a part of a controller, such as a weighing scale controller. The weighing scale controller may be in the form of a weigh terminal, such as for example, a model IND780 weigh terminal available from Mettler-Toledo in Columbus, Ohio. The load cells may be various types of digital load cells capable of reporting the described information to the controller. For example, and without limitation, the load cells may be Powercell® PDX® load cells also available from Mettler-Toledo, and may be arranged as a Powercell PDX network of load cells.

While certain exemplary embodiments of the present invention are described in detail above, the scope of the invention is not to be considered limited by such disclosure, and modifications are possible without departing from the spirit of the invention as evidenced by the following claims:

What is claimed is:

1. A method of evaluating the condition of a given load cell of a multiple-load cell vehicle weighing scale, comprising:
   identifying a dynamically changing, normal weight transfer pattern of behavior associated with the outputs of each load cell during a typical operation of weighing a vehicle on the vehicle weighing scale or a like vehicle weighing scale;
   extracting from the weight transfer patterns of behavior, the expected state condition for each of the load cells of the scale for different vehicle positions that will normally exist during a typical vehicle weighing operation;
   comparing the actual load cell state conditions observed during a given vehicle weighing operation to the expected load cell state conditions; and
   analyzing the results of the comparison for each load cell to determine whether a given load cell of the vehicle weighing scale is operating properly.

2. The method of claim 1, further comprising:
   extracting from the weight transfer patterns of behavior, the expected state of a gross weight reading produced by the load cells for different vehicle positions that will normally exist during a typical vehicle weighing operation; and
   comparing the actual gross weight reading state conditions observed during a normal vehicle weighing operation to the expected gross weight reading state conditions.

3. The method of claim 1, wherein a load cell is determined to be operating improperly only after an actual state condition of the load cell differs from an expected state condition of the load cell some predetermined number of times within some predetermined time period.

4. The method of claim 1, further comprising issuing an alert when a load cell is determined to be operating improperly.

5. The method of claim 1, wherein the expected state of each load cell output during a given portion of a typical vehicle weighing operation is based on a plurality of expected loading conditions, including:
   all of the load cells should experience at least one load-unload cycle per vehicle;
   the load applied by the vehicle being weighed should be initially applied to the load cells in a sequential, direction-of-travel order;
   left-right load applied by the vehicle being weighed should be encountered by the corresponding load cells substantially simultaneously;
   the center of gravity of the load applied by the vehicle should move monotonically in the direction of travel; and
   the left-right load balance on the load cells should remain constant.

6. The method of claim 1, wherein the expected state of each load cell output during a given portion of a typical vehicle weighing operation is based on an expected pattern of vehicle movement, the pattern of movement being:
   the vehicle enters an initially empty vehicle scale and moves along a platform of the scale;
   the vehicle either moves to a stopped position for weighing or exits the scale platform, with or without a temporary start and restart of movement; and
   upon leaving the stopped weighing position, the vehicle moves along the scale platform until the vehicle exits the scale.

7. The method of claim 1, wherein cargo or other permissible items may be added to or removed from the vehicle while the vehicle is in the stopped position.

8. The method of claim 1, wherein any load cell output that does not move during a weighing operation is considered an error.

9. The method of claim 1, wherein a load cell output analysis may not be performed unless the gross weight reading value provided by the load cells is greater than a predetermined threshold weight reading value that is representative of the load borne by the load cells when the scale is in an unloaded state.

10. A method of evaluating the operational condition a given load cell of a vehicle weighing scale, the scale having a scale platform supported from beneath by multiple load cells that are arranged in pairs in two spaced apart rows that are aligned in the direction of normal vehicle travel across the scale platform, the method comprising:
   identifying a dynamically changing, normal weight transfer pattern of behavior associated with the outputs of each load cell during a typical operation of weighing a vehicle on the vehicle weighing scale or a like vehicle weighing scale;
   extracting from the weight transfer patterns of behavior the expected state condition for each of the load cells of the scale and the expected state of a gross weight reading produced by the load cells, for different vehicle positions that will normally exist during a typical vehicle weighing operation;
   using a microprocessor and associated programming to compare the actual load cell output state conditions and the actual states of the gross weight reading produced by the load cells during a given vehicle weighing operation to the expected load cell output state conditions and expected states of the gross weight reading; and
   using the microprocessor and associated programming to analyze the results of the comparisons and, if a trend of unexpected load cell state conditions or unexpected gross weight reading states is detected, to provide notice of improper load cell operation.

11. The method of claim 10, wherein the expected state of each load cell output during a given portion of a typical vehicle weighing operation is based on a plurality of expected loading conditions, including:

all of the load cells should experience at least one load-unload cycle per vehicle;

the load applied by the vehicle being weighed should be initially applied to the load cells in a sequential, direction-of-travel order;

left-right load applied by the vehicle being weighed should be encountered by corresponding load cells of each row substantially simultaneously;

the center of gravity of the load applied by the vehicle should move monotonically in the direction of travel; and the left-right load balance on the load cells should remain constant.

12. The method of claim 11, wherein the left-right load balance during scale entry and exit is ignored.

13. The method of claim 11, wherein when performing a center of gravity analysis:

load cell pair data is used;

load cell spacing in the direction of travel is either known or a uniform spacing is assumed; and there is hysteresis in the evaluation of forward motion to prevent false triggers.

14. The method of claim 10, wherein a constant left-right load balance is indicated when the ratio of the sum of all of the left side load cell weight readings to the sum of all of the right side load cell weight readings remains substantially constant.

15. The method of claim 10, wherein the expected state of each load cell output during a given portion of a typical vehicle weighing operation is based on an expected pattern of vehicle movement, the pattern of movement being:

the vehicle enters an initially empty vehicle scale and moves along the scale platform;

the vehicle either moves to a stopped position for weighing or exits the scale platform, with or without a temporary start and restart of movement;

while in the stopped position, cargo or other permissible items may be added to or removed from the vehicle; and upon leaving the stopped weighing position, the vehicle moves along the scale platform until the vehicle exits the scale.

16. The method of claim 10, wherein the notice of improper load cell operation is in the form of an alert transmitted to one or more persons.

17. The method of claim 10, wherein the notice of improper load cell operation is in the form of a log file entry.

18. A method of evaluating the operational condition a given load cell of a vehicle weighing scale, the scale having a scale platform supported from beneath by multiple load cells that are arranged in pairs in two spaced apart rows that are aligned in the direction of normal vehicle travel across the scale platform, the method comprising:

identifying a dynamically changing, normal weight transfer pattern of behavior associated with the outputs of pairs of load cells as a result of expected vehicle movement along the scale platform during a typical vehicle weighing operation, each pair of load cells comprising a first load cell from one row of load cells and a second load cell from the other row of load cells that resides at a like distance from a given end of the scale platform as the first load cell;

ascertaining from the weight transfer patterns of behavior the expected state condition for each of the load cells of the scale and the expected state of a gross weight reading produced by the load cells, for different vehicle positions that will normally exist during a typical vehicle weighing operation;

detecting the presence of a vehicle on the scale when a gross weight reading provided by the load cells exceeds a predetermined threshold weight;

applying tests for determining proper load cell operation based on the expected load cell pair output state conditions, the tests expecting that:

all of the load cells will experience at least one load-unload cycle per vehicle, the load applied by the vehicle being weighed will be initially applied to the load cells in a sequential, direction-of-travel order, the left-right load applied by the vehicle being weighed will be encountered by the load cell pairs substantially simultaneously, the load center of gravity applied by the vehicle will move monotonically in the direction of travel, and the left-right load balance on the load cell pairs will remain substantially constant;

using a microprocessor and associated programming to analyze, against the test criteria, the actual load cell output state conditions observed during a given vehicle weighing operation, and to provide test results;

identifying, with the microprocessor and associated programming, improper load cell operation when a trend of unexpected load cell state conditions is detected; and providing notice of improper load cell operation.

19. The method of claim 18, wherein the expected state of each load cell output during a given portion of a typical vehicle weighing operation is based on an expected pattern of vehicle movement, the pattern of movement being:

the vehicle enters an initially empty vehicle scale and moves along the scale platform;

the vehicle either moves to a stopped position for weighing or exits the scale platform, with or without a temporary start and restart of movement; and upon leaving the stopped weighing position, the vehicle moves along the scale platform until the vehicle exits the scale.

20. The method of claim 18, wherein the notice of improper load cell operation is in a form selected from the group consisting of one or both of an alert transmitted to one or more persons and a log file entry.

* * * * *